(12) United States Patent
Carkner et al.

(10) Patent No.: US 6,856,654 B1
(45) Date of Patent: Feb. 15, 2005

(54) POWER SUPPLY SYSTEM FOR A PACKET-SWITCHED RADIO TRANSMITTER

(75) Inventors: Steven Carkner, Ontario (CA); Robert J. Lowles, Waterloo (CA); Kent Nickerson, Waterloo (CA); Carl Schaaff, Guelph (CA)

(73) Assignee: Research In Motion Limited, Waterloo (CA)

( * ) Notice: Subject to any disclaimer, the term of this patent is extended or adjusted under 35 U.S.C. 154(b) by 445 days.

(21) Appl. No.: 09/589,728

(22) Filed: Jun. 8, 2000

Related U.S. Application Data (63) Continuation-in-part of application No. 08/929,616, filed on Sep. 15, 1997, now Pat. No. 6,104,759.

(51) Int. Cl.⁷ .............................................. H04L 27/04

(52) U.S. Cl. ....................................... 375/295

(58) Field of Search ................................ 375/295, 222, 375/241, 239, 297; 307/31, 106, 109, 125, 126, 108; 323/282, 259; 363/41

(56) References Cited

U.S. PATENT DOCUMENTS

| | | | |
|---|---|---|---|
| 3,775,659 A | | 11/1973 | Carlsen, II |
| 4,510,431 A | | 4/1985 | Winkler |
| 5,173,855 A | | 12/1992 | Nielsen et al. |
| 5,272,475 A | | 12/1993 | Eaton et al. |
| 5,591,212 A | | 1/1997 | Keimel |
| 5,631,503 A | | 5/1997 | Cioffi |
| 5,638,540 A | | 6/1997 | Aldous |
| 5,786,992 A | * | 7/1998 | Vinciarelli et al. ........... 363/89 |
| 5,850,113 A | | 12/1998 | Weimer et al. |
| 5,939,860 A | | 8/1999 | William |
| 6,093,982 A | * | 7/2000 | Kroll ......................... 307/115 |
| 6,104,162 A | | 8/2000 | Sainsbury et al. |
| 6,104,759 A | | 8/2000 | Carkner et al. |

* cited by examiner

Primary Examiner—Khai Tran
(74) Attorney, Agent, or Firm—Jones Day; Krishna Pathiyal; Robert Liang (57) ABSTRACT

An apparatus and method is disclosed which allow a limited energy source (such as a low voltage battery stack or a low current computer auxiliary device power connection) to charge a high performance capacitive device, which in turn powers a low duty-cycle, high power load circuit (such as a packet-switched radio data transmitter).

66 Claims, 7 Drawing Sheets

POWER SUPPLY SYSTEM FOR A PACKET-SWITCHED RADIO TRANSMITTER

This application is a continuation-in-part application based upon U.S. patent application Ser. No. 08/929,616 filed Sep. 15, 1997, entitled "Improved Power Supply System For A Packet-Switched Radio Transmitter," now U.S. Pat. No. 6,104,759.

FIELD OF THE INVENTION

The present invention relates to the field of electrical power supply management circuitry, and in particular, to improved power supplies for low duty-cycle radio frequency ("RF") communication systems, such as digital, packet-switched RF transmission devices.

BACKGROUND OF THE INVENTION

Low duty-cycle radio frequency ("RF") communication systems, such as digital, packet-switched RF transmission devices, typically include miniaturized low voltage power sources, and are characterized by relatively long time intervals between RF transmissions. These systems, however, require that large bursts of power be delivered quickly for transmitter operation. The present invention allows for substantial improvements in efficiency and effective battery life for such systems. In a conventional prior art digital RF communication system, the transmitter circuitry modulates a carrier signal with a binary signal, producing a transmitted RF sequence representing binary ones and zeroes. Under a packet-switched communications protocol, these binary one and zero bits are transmitted in discrete blocks ("packets") consisting of address, data, sender identification, and other control bits. The packets are not transmitted continuously, but are stored until a packet or group of packets is ready for transmission. Thus, the power amplifier for a conventional packet-switched transmitter requires high input power only for short intervals, with relatively long low power quiescent periods in-between. As a result, the "duty-cycle" of such a system, i.e., the percentage of the total cycle time taken by the active transmission time is quite low.

Despite the low duty-cycle of the system, the power amplifier for a conventional packet-switched transmitter produces a very high current load, drawing about 1000 milliamps (mA) or more for one second during transmission. In prior art technologies, the RF transmitter was often powered directly from a conventional battery; however, the high power demands of the power amplifier imposed severe limitations on the type of battery technology that could be used. Conventional carbon-based batteries typically could not provide sufficient instantaneous power for such a transmitter. While a conventional alkaline cell could have powered the transmitter, the equivalent resistance of such a cell will climb rapidly as the cell is depleted. This increasing resistance reduces the current that can be supplied to the transmitter and reduces the usable battery life. Ultimately, the instantaneous current supplied by an alkaline cell will fall below the power amplifier's input power requirements. In the prior art, this level of depletion would typically be reached while the battery still had significant capacity remaining; thus, a user would be required to replace a reasonably fresh battery.

Alternatively, some prior art packet-switched systems, such as portable RF modems, used internal, single-use alkaline cells to charge a rechargeable battery stack. This battery stack in turn supplied the power for the RF transmitter. These systems were quite inefficient, however, because the battery stack would be overcharged, storing up far more power than that normally needed for sending a short packet-switched message. Also, such power supply circuitry consumed space, was expensive, and was unnecessarily complex. In addition, conventional rechargeable batteries, such as a Ni—Cd cell stack, have a long charge cycle, sometimes measured in hours, and could withstand only a limited number of charge cycles, perhaps about 300, before such batteries themselves would have to be replaced.

Other types of batteries exist that provide high energy storage, but are incompatible with conventional packet-switched RF transmission systems because of the high equivalent series resistance ("ESR") of the cell. For example, a single-use lithium cell, such as an Ultralife®9-volt cell (a registered trademark of Ultralife Batteries, Inc. of New York, N.Y.), has a very high stored energy rating of 9,000 milliwatt hours (mWhrs), as compared with only about 800 mWhrs for the typical rechargeable stack, or about 3000 mWhrs for a typical 9-volt alkaline cell. Unfortunately, a lithium cell has an ESR of over 10 ohms, even when new, and can only deliver a peak instantaneous power of about 0.75 watts. Because the typical RF transmitter requires 5 watts of input power and cannot tolerate an ESR of greater than 2 ohms, a cell such as the Ultralife® is not a viable power source despite its large storage capacity.

Similarly, a host computer auxiliary device power pin would be unsuitable to power a conventional packet-switched RF transmitter. Because most host computers can supply only about 0.75 watts to a PCMCIA slot or other types of card plug-in modules, such a source of supply could not directly power a typical packet-switched transmitter, whose power amplifier would require 5 watts of instantaneous power.

Therefore there remains a need for a power supply system capable of quickly delivering short bursts of high power with high efficiency, while remaining small enough for miniaturized RF communication applications.

There also remains a need for a power supply system capable of powering a low duty-cycle application requiring high instantaneous power from a battery, or other stored energy source having limited energy capacity, for substantial lengths of time.

There remains a further need for a self-contained, miniaturized, integrated power supply system capable of powering a low duty-cycle application requiring high instantaneous power from a current-limited source, such as a host computer auxiliary device power pin.

Finally, there remains a more particular need for a cost effective power supply circuit for a portable, PCMCIA-compatible radio modem, or a stand alone two-way pager system, which provides improved battery life, or alternately allows such a system to be powered directly from a host computer PCMCIA slot.

SUMMARY OF THE INVENTION

To improve upon the foregoing technology as disclosed in the current state-of-the-art, the present invention discloses an apparatus and method which allows a limited energy source (such as a low voltage battery stack or a low current computer auxiliary device power connection) to charge a high performance capacitive device, which in turn powers a low duty-cycle, high power load circuit (such as a packet-switched radio data transmitter). The load circuit's low duty-cycle allows the limited energy source to charge the high performance capacitive device sufficiently for periodic high power pulses. The high performance capacitive device provides "load-leveling" (i.e., an averaging out of the high transient currents drawn by the time varying, high power load), effectively isolating the input charging source from the large transient currents drawn by the load circuit such as during RF transmission by an RF transmitter.

The present invention provides many advantages over the presently known power distribution systems. Not all of these advantages are simultaneously required to practice the invention as claimed, and the following list is merely illustrative of the types of benefits that may be provided, alone or in combination, by the present invention. These advantages include: (1) increased battery life of the limited energy source; (2) reduced charging time; (3) reduced unit weight and size of the power distribution system; (4) reduced cost and complexity of the power supply circuitry; (5) simplified use and maintenance; (6) more predictable operation; (7) increased operational life of a unit employing the inventive system; and (8) reduced dollar costs for components.

In accordance with the present invention, a method is provided for extending the operational life of a battery device used to provide power to a low-duty cycle load circuit in a portable electronic device. The method comprises the steps of providing a capacitance network in the device; charging the capacitance network with the battery device; and providing energy to the load circuit, via the capacitance network, during the active portion of the duty cycle.

In another embodiment, a method is provided for extending the operational life of a battery device used to provide power to a low-duty cycle load circuit in a portable electronic device that comprises the steps of providing a capacitance network and a voltage regulator wherein the capacitance network comprises a first capacitance component and a second capacitance component. The method further comprises the steps of charging the second capacitance component with the battery device; powering the voltage regulator with the second capacitance component; charging the first capacitance component with the voltage regulator; and providing energy to the load circuit, via the capacitance network, during the active portion of the duty cycle.

In accordance with the present invention, a power management system for a portable electronic device having a low duty cycle transmitter is provided. The system comprises a limited energy source; a capacitive network coupled to the limited energy source and to the transmitter wherein the capacitive network comprises a first capacitance component and a second capacitance component; and a voltage regulator coupled to the capacitive network. In the system the limited energy source charges the second capacitive component, the second capacitive component provides energy to the voltage regulator, the voltage regulator charges the first capacitance component, and the capacitive network provides sufficient energy to power the transmitter when the transmitter is actively transmitting.

In another embodiment, the power management system comprises a limited energy source; a capacitive network coupled to said limited energy source; and a voltage regulator coupled to said capacitive network and to the transmitter; wherein the limited energy source charges the capacitive network, the capacitive network provides energy to the voltage regulator, and the voltage regulator provides sufficient energy to power the transmitter when the transmitter is actively transmitting.

In yet another embodiment, the power management system comprises a limited energy source; a capacitive network coupled to the limited energy source; and a voltage regulator coupled to the capacitive network and to the transmitter; wherein the limited energy source provides energy to the voltage regulator, the voltage regulator charges the capacitive network, and the capacitive network provides sufficient energy to power the transmitter when the transmitter is actively transmitting.

BRIEF DESCRIPTION OF DRAWINGS

The present invention satisfies the needs noted above as will become apparent from the following description when read in conjunction with the accompanying drawings, wherein.

DETAILED DESCRIPTION OF THE PREFERRED EMBODIMENTS

A high performance capacitive device useful with the present invention should possess high charge storage capacity with relatively low ESR in order to meet the input power needs of the typical transmitter power amplifier. For example, capacitive devices are now available that allow relatively large amounts of electrical energy to be temporarily stored and retrieved at much higher levels than standard batteries or conventional capacitors would allow. One class of such devices are specially constructed capacitors with very high storage capabilities referred to as super-capacitors.

A super-capacitor will generally have a rating of 1.0 farad or more of storage capacity, yet will only occupy the physical volume of a standard capacitor with only 0.002 farads of capacity. These devices are typically used to provide emergency backup power in computing applications, such as for CMOS microprocessors. The component miniaturization provided by super-capacitors is important if the power supply system is to be useful for portable RF transmitter applications, such as radio modems and two-way pagers. For such units, small size is important; and in particular, it is generally desired that the components used in such devices be housed in a package that is at least functionally compatible with the physical form-factor and electrical interface requirements for host computer plug-in auxiliary modules, such as PCMCIA Type-2 or other plug-in cards. Furthermore, present manufacturing techniques have produced super-capacitors with relatively low ESR. Such super-capacitors might be used as the high performance capacitive element in the inventive system.

The load-leveling provided by the inventive power supply system allows sustained RF transmitter operation when battery cells are used as the input power source, even as the batteries weaken, and their ESR rises. The efficiencies realized can increase the useful battery life of a product by six times or more.

The inventive system also allows an input power source capable of supplying only limited current to drive a low duty-cycle application requiring high instantaneous power. For example, using this system, a PCMCIA compatible RF transmission system may be powered directly from a host computer's PCMCIA slot. In addition, the inventive system allows the use of high capacity lithium batteries as the power source despite their high ESR, resulting in even greater increases in battery life over other battery technologies.

The power supply system described herein also possesses distinct advantages over systems in which a single-use battery is used to charge a rechargeable battery stack. The inventive system provides increased battery life of the host source by avoiding continuous and inefficient charging of a battery stack. Furthermore, this system reduces the charging time from hours to seconds; allows for reductions in unit weight and size; reduces the cost and complexity of the power supply circuitry because no battery contacts or complex charging algorithms are required; simplifies the use and maintenance of the unit, since the user no longer needs to replace an additional internal battery as well as the main cells whenever one of these batteries dies; and provides more predictable operation, since the capacitive device can always be charged to the same voltage with the addition of a voltage regulator.

In addition, when a low resistance super-capacitor is used as the capacitive device, the operational life of a unit employing the inventive system is significantly longer than conventional systems, since these capacitive devices can survive over 250,000 charge cycles, while a Ni—Cd rechargeable battery can only survive about 300 to 500 charge cycles. Furthermore, a power supply system in accordance with the present invention would be less expensive, since, for example, a typical Ni—Cd stack at present would cost approximately twenty dollars, while a super-capacitor today costs only about two dollars.

Figure 1:
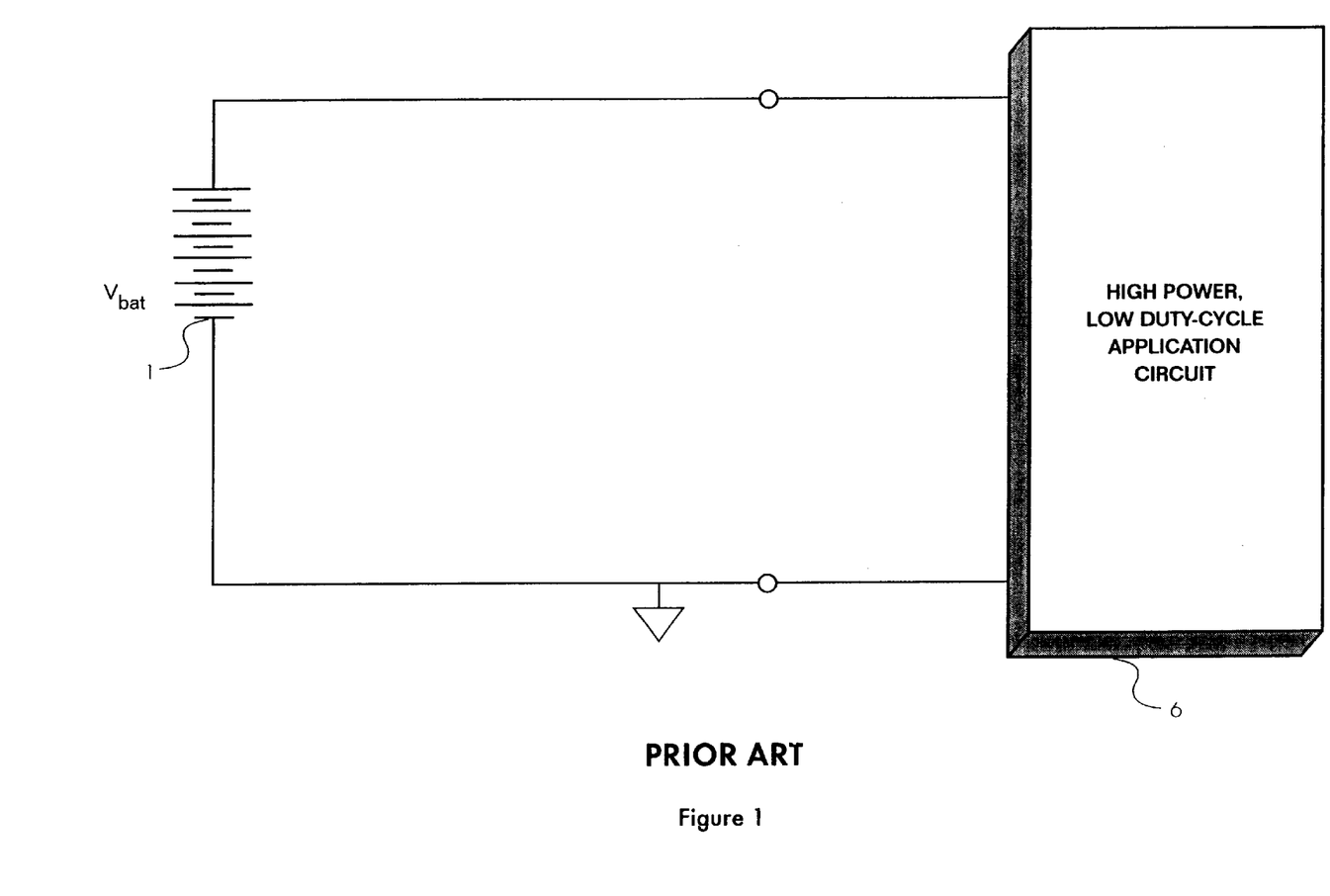
FIG. 1 is a simplified electrical schematic diagram of a direct battery power supply circuit as in the prior art.
Figure 2:
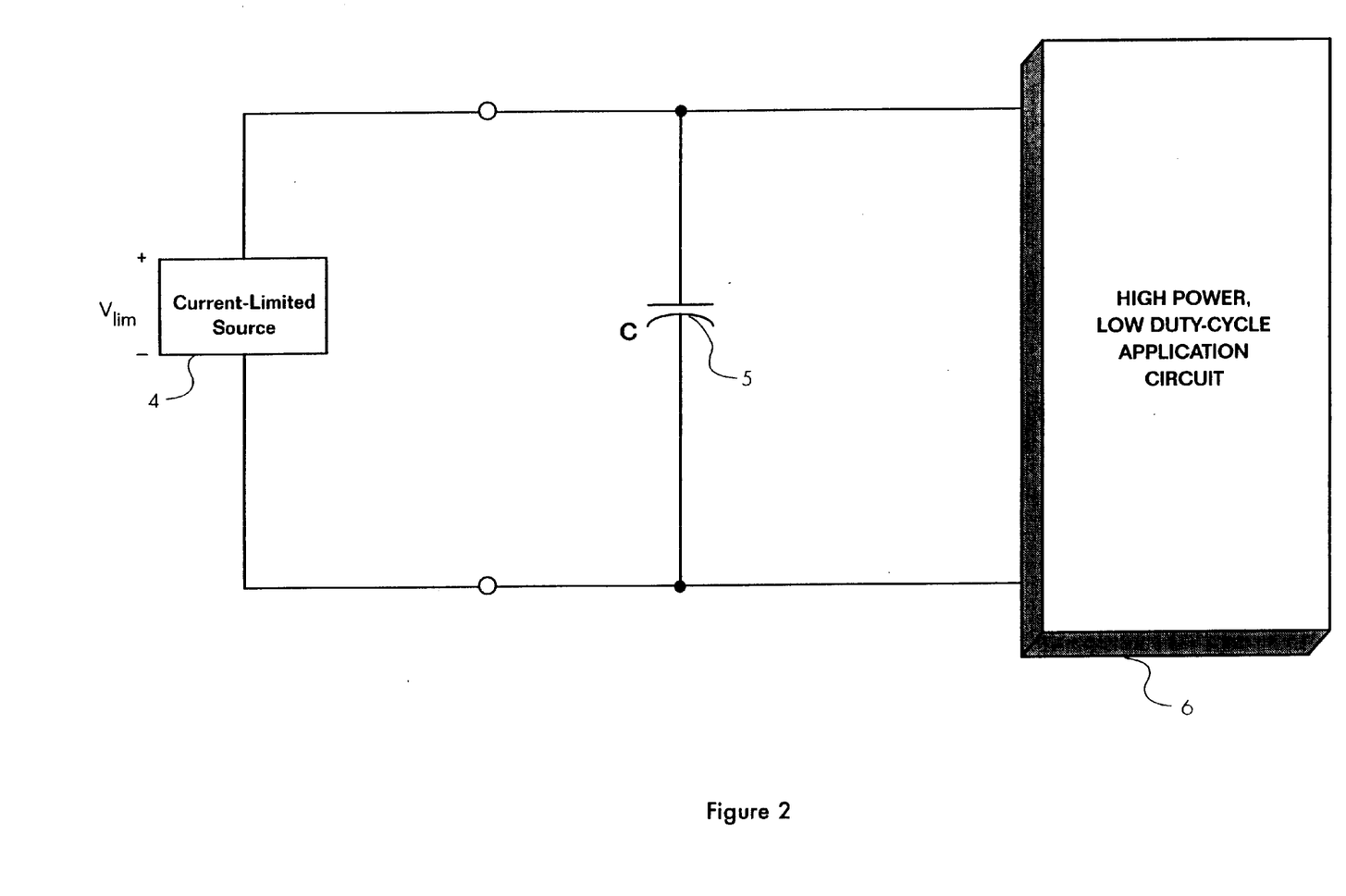
FIG. 2 is a simplified electrical schematic diagram of a system in accordance with the present invention.
Figure 3:
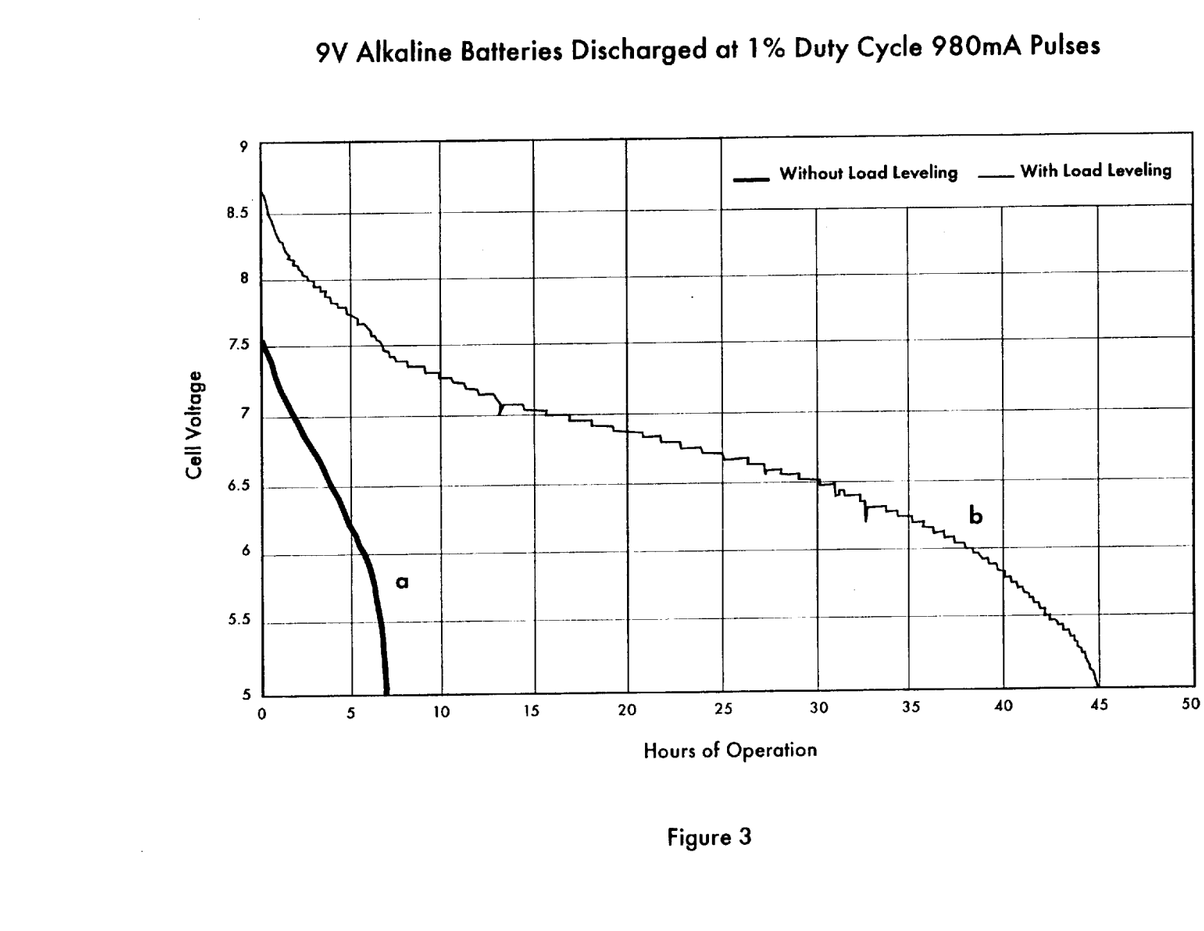
FIG. 3 is a graph comparing the hours of RF transmitter operation achieved with the prior art system of FIG. 1 with those obtained with the system in accordance with the present invention of FIG. 2.

To appreciate some of the advantages of the inventive system, FIGS. 1, 2, and 3 provide a comparison between prior art technology and a simplified power supply system in accordance with the present invention.

The circuit of FIG. 1 depicts the direct use of battery voltage source 1 to power high power, low duty-cycle application circuit 6, as in the prior art. Battery 1 in such a system might be a standard 9-volt Duracell® (a registered trademark of Duracell, Inc. of Bethel, Conn.) MN1304 alkaline battery. The ESR for such a cell starts at about 0.1 ohm when the cell is new, climbs to about 2 ohms when the battery is at about 80% capacity, and eventually reaches approximately 250 ohms when the battery is nearly dead. The high ESR of the battery results in a steep voltage drop whenever load application 6 draws high current. Such a condition occurs when an RF transmitter attempts to transmit a packet, at which point the power amplifier could draw a transient current of over 1 amp.

When the load is removed from the alkaline battery at the end of a transmission, the battery cell voltage recovers somewhat from the drop experienced during a transmission. At first, the cell voltage rapidly increases by about 50 millivolts, after which it continues to rise, but much more gradually. Over the course of multiple transmission cycles, however, the increasing voltage drop resulting from the battery's increasing ESR, in conjunction with the depletion of the battery during transmission, will become too great, and the alkaline cell cannot recover sufficient cell voltage within the non-transmitting portion of the cycle to power the next transmission. The battery would then be effectively dead and would have to be replaced.

FIG. 2 depicts a simplified circuit in accordance with the present invention, although not the preferred embodiment. Source 2 may be any "current-limited" source, i.e., a source having a high ESR or a varying ESR, such as a lithium battery, or a source which otherwise can deliver only small currents with low instantaneous power, such as the PCMCLA slot of a host computer. High performance capacitive device 5 (denoted C) is the direct power source for high power, low duty-cycle load application 6, which might be a packet-switched RF transmitter, such as that used in a two-way paging system.

Capacitive device 5 of FIG. 2 might be effectively implemented using a network of super-capacitors connected in series to provide a capacitance sufficient to drive the power amplifier of an RF transmitter for one transmit cycle at the highest expected power-draw. The interrelationships between the voltage required at capacitive device 5, the ESR of device 5, and the time duration of the load circuit transmissions may be understood by reference to the following equations:

$$V_{capmin} = V_{trmin} + V_{drop} + V_{capdis} \qquad \text{EQUATION 1;}$$

Where $V_{capmin}$ is the minimum voltage to which capacitive device 5 must be charged for transmitter operation;

$V_{trmin}$ is the minimum operating voltage of the transmitter power amplifier;

$V_{drop}$ is the voltage drop caused by the current draw of the power amplifier multiplied by the capacitor's ESR [i.e., $V_{drop} = I_{draw} \times ESR$]; and $V_{capdis}$ is the voltage change capacitive device 5 will under go from the start of a transmit to the end.

$V_{capdis}$ may be further defined as follows:

$$V_{capdis} = (I_{draw} \times T_{capdis})/\text{Capacitance} \qquad \text{EQUATION 2.}$$

($I_{draw}$ equals the average current of the load and $T_{capdis}$ is the length of the load pulse.)

The equations defining $V_{capmin}$ and $V_{capdis}$ can be combined and rearranged to provide the following capacitance relationship:

$$\text{Capacitance}(C) = (I_{draw} \times T_{capdis})/V_{capdis};$$

$$C = (I_{draw} \times T_{capdis})/[V_{capmin} - V_{trmin} - (I_{draw} \times ESR)] \qquad \text{EQUATION 3.}$$

Considering the variations in present network protocols, the transmit time for a single packet in a packet-switched network could range from 20 milliseconds (mS) to 2 seconds depending on the nature of the network and the amount of data being sent in a given packet. Also, some conventional power amplifiers operate at voltages ranging from 3.6 volts at 2 amps to 6 volts at 800 mA. Thus, a system in accordance with FIG. 2, operating in a network having a single packet transmit time of 2 seconds, with the transmitter output driven by a 3.6 volt, 2 amp power amplifier, and with a charging voltage of 6.9 volts, would require a capacitance for capacitance device 5 as follows (assuming a nominal 0.3 ohm ESR for device 5):

$$C = (2.0 \text{ amps} \times 2 \text{ secs})/[6.9 \text{ volts} - 3.6 \text{ volts} - (2.0 \text{ amps} \times 0.3 \text{ ohms})];$$

$$= 1.481 \text{ farads (or approximately 1.5 farads).}$$

Thus, in this example, a device of at least 1.5 farad capacitance might be used for device 5, and if the design is to be more robust, a capacitance of about 3.0 farads or more might be desired. A capacitive module comprising multiple super-capacitors connected in series can meet such requirements.

Series connection of multiple super-capacitors is preferred in part because the working voltage for a single super-capacitor, (i.e., the voltage above which damage will occur to the super-capacitor), is typically only a few volts, resulting in insufficient stored voltage to power the average RF transmitter. While connecting super-capacitors in series overcomes the limited working voltage of a single super-capacitor, it should be appreciated that high performance capacitive device 5 could be implemented with a single super-capacitor having sufficient capacitance and working voltage ratings.

In the circuit of FIG. 2, the ESR of capacitive device 5 must be kept low (generally below 2 ohms and preferably below 1 ohm) in order to provide sufficient current at sufficient voltage for transmitter operation. An approach for achieving high capacitance with low ESR is by use of a super-capacitor employing an electric double-layer structure with an activated carbon electrode. Such super-capacitors are described in *Supercapacitor—Electric Double-Layer Capacitors*, Vol. 2, Oct. 25, 1996 (Japan, Tokin Corporation, Cat. No. EC-200E). Over the past year, manufacturing techniques for such super-capacitors have improved sufficiently that devices with ESR's of less than 1 ohm are commercially available, although the minimum ESR is ultimately limited by the surface resistance between the activated carbon electrodes and the connection leads of the capacitor. Examples of such super-capacitors would include the Ultra-Capacitor manufactured by Maxwell Corporation of San Diego, Calif.; the Gold-Capacitor (or GoldCap) manufactured by Panasonic Corporation of Mississauga, Ontario; and the Aero-Capacitor manufactured by Polystor Corporation of Dublin, Calif.

FIG. 3 compares the hours of operation achieved with the circuit of FIG. 1, represented by graph a, and the circuit in accordance with the present invention, FIG. 2, represented by graph b. The exemplary application circuit for the FIG. 3 plot is a packet-switched RF transmitter operating at a duty-cycle of about 1 percent, with power amplifier load pulses of about 1.0 second in duration. The 1 percent duty-cycle allows 100 seconds of recharge time. For this comparison, both current-limited source 4 of FIG. 2 and battery 1 of FIG. 1 are assumed to be conventional 9-volt alkaline cells equivalent to Duracell® MN1304 cells. Graphs a and b plot the cell voltage of battery 1 of FIG. 1 and source 4 of FIG. 2 respectively at the end of each transmission. As indicated at the top of FIG. 3, the transmitter power amplifier is drawing 980 mA (approximately 5 to 6 watts) during the transmit pulses.

The exemplary transmitter for the FIG. 3 comparison cannot operate from an input voltage lower than 5 volts. (Of course, in practice, transmitter operation might be possible at voltages as low as approximately 3–5 volts, depending on the characteristics of the particular power amplifier.) Using the exemplary transmitter, the prior art circuit of FIG. 1 only achieves approximately 7 hours of transmitter operation, as shown in the graph a, with the cessation of operation corresponding to the point where the voltage of battery 1 drops to 5 volts.

For the inventive circuit of FIG. 2, however, the load-leveling provided by high performance capacitive device 5 effectively isolates current-limited source 4 from the large transient currents drawn by application circuit 6. Thus, in FIG. 2, the energy of source 4 is required only for the relatively slow, and therefore less power consuming chore of charging capacitive device 5, resulting in a dramatic increase in the operational life of source 4.

The operational characteristics of the system of FIG. 2 are governed by the idealized parameter relationships of Equation 1. Thus, for an exemplary transmitter system drawing 980 mA of current for 1.0 second during transmission, and assuming a 1.0 farad, 0.3 ohm ESR super-capacitor module is used for capacitive device 5, the minimum cell voltage required before transmitting (Le, the minimum voltage to which the capacitor must be charged before transmission) is calculated from Equation 1 as follows:

$$V_{capmin} = V_{trmin} + V_{drop} + V_{capdis};$$

$$= V_{trmin} + (I_{draw} \times ESR) + (I_{draw} \times T_{capdis})/C;$$

$$= 5 \text{ volts} + (980 \text{ mA} \times 0.3 \text{ ohm}) + (980 \text{ mA} \times 1.0 \text{ sec})/1.0 \text{ farad};$$

$$= 6.27 \text{ volts (or approximately 6.3 volts).}$$

As indicated in FIG. 3, graph b, the power supply system of FIG. 2 will adequately power the transmitter load circuit until the voltage of capacitive device 5 drops to 5.0 volts or less at the end of a transmission. This is the point at which the cell will not be able to supply the 6.3 volts necessary to charge the capacitor for the next transmission within the 100 second recharge time. As shown in graph b, this point is not reached until after approximately 45 hours of operation; thus, the system of FIG. 2 provides an approximate six-fold increase in effective battery life and transmitter operation over the system of FIG. 1.

Furthermore, in FIG. 2, the high ESR of battery 1 is not present at the input of application circuit 6, and is replaced by the constant and relatively low ESR of capacitive device 5. High performance capacitive device 5 itself is not sensitive to the voltage drop associated with the ESR of source 4. It will therefore continue to charge, although at a reduced charging rate, even as the alkaline battery serving as voltage source 4 is depleted, and the battery's ESR rises to its maximum. Indeed, even if the battery were dead, the voltage of high performance capacitive device 5 would eventually rise to the normal open-circuit voltage of the cell, which for a 9-volt cell might provide sufficient power for the exemplary transmitter to send a single packet (if the cell reached the required 6.3 volts mentioned earlier).

Current-limited source 4 of FIG. 2 may be a source incapable of supplying sufficient instantaneous current to power an RF transmitter directly. The low duty-cycle of application circuit 6, which in the exemplary application of FIG. 3 is 1%, allows capacitive device 5 to charge sufficiently to supply the power required by application circuit 6, even if capacitive device 5 is charged by a low current, low power source. For example, if an Ultralife® battery is used as source 4, the battery's high energy storage capacity would provide over 140 hours of operational time for the exemplary RF transmitter of FIG. 3, an increase of approximately 2000% over standard alkaline cells operating without use of a high performance capacitive device such as a super-capacitor.

Where load application 6 is an RF transmitter, the duty-cycle of load 6 may be defined as follows:

$$\text{duty-cycle}(\%) = T_{tr}/(T_{tr}+T_{qst}) \quad \text{EQUATION 4;}$$

Where $T_{tr}$ is the time duration of a transmission, and $T_{qst}$ is the time duration of the succeeding transmitter quiescent period (i.e., the non-transmitting interval) within an operational cycle.

In the context of the present invention, a "low" duty-cycle would typically exist where $T_{qst}$ exceeds $T_{tr}$ by an order of magnitude or more. With some systems it may be possible to dynamically adjust the transmitter's operating characteristics to account for differing network coverage envelope conditions and power requirements, perhaps allowing for operation at duty-cycles in the range of 50% to 75% for short intervals. Such a dynamically-controlled transmitter would still be an appropriate candidate for meeting the requirements of load application 6 so long as the average system duty cycle remains in the range of approximately 10% or less.

As a potential alternative to using a battery cell or cell stack, one might wish to power a miniaturized RF transmitter from the PCMCIA slot or other auxiliary port of a host computer. Although most host computers can supply only about 0.75 watts to the PCMCIA slot, a low energy, low current source such as this may effectively serve as source 4 in the circuit of FIG. 2. Using the circuit of FIG. 2, a radio modem requiring five watts of power in short pulses may be powered from a PCMCIA slot having the typical maximum current of only 150 mA.

While illustrative of the invention, the circuit of FIG. 2 does not regulate the voltage across high performance capacitive device 5. Without adding some form of "step-up" regulation, the circuit of FIG. 2 would not support transmitter operation from an initial input voltage that is less than that required at capacitive device 5, as per Equation 1 (i.e., a "low" voltage input could not serve as source 4 because such a source would not charge capacitive device 5 sufficiently). On the other hand, if a "high" voltage source is used as source 4, lack of voltage regulation would require use of super-capacitors having a high working voltage rating, and the use of RF transmission circuitry capable of withstanding voltages varying from 10 volts down to 5 volts, depending on the state of charge of the super-capacitors.

Figure 4:
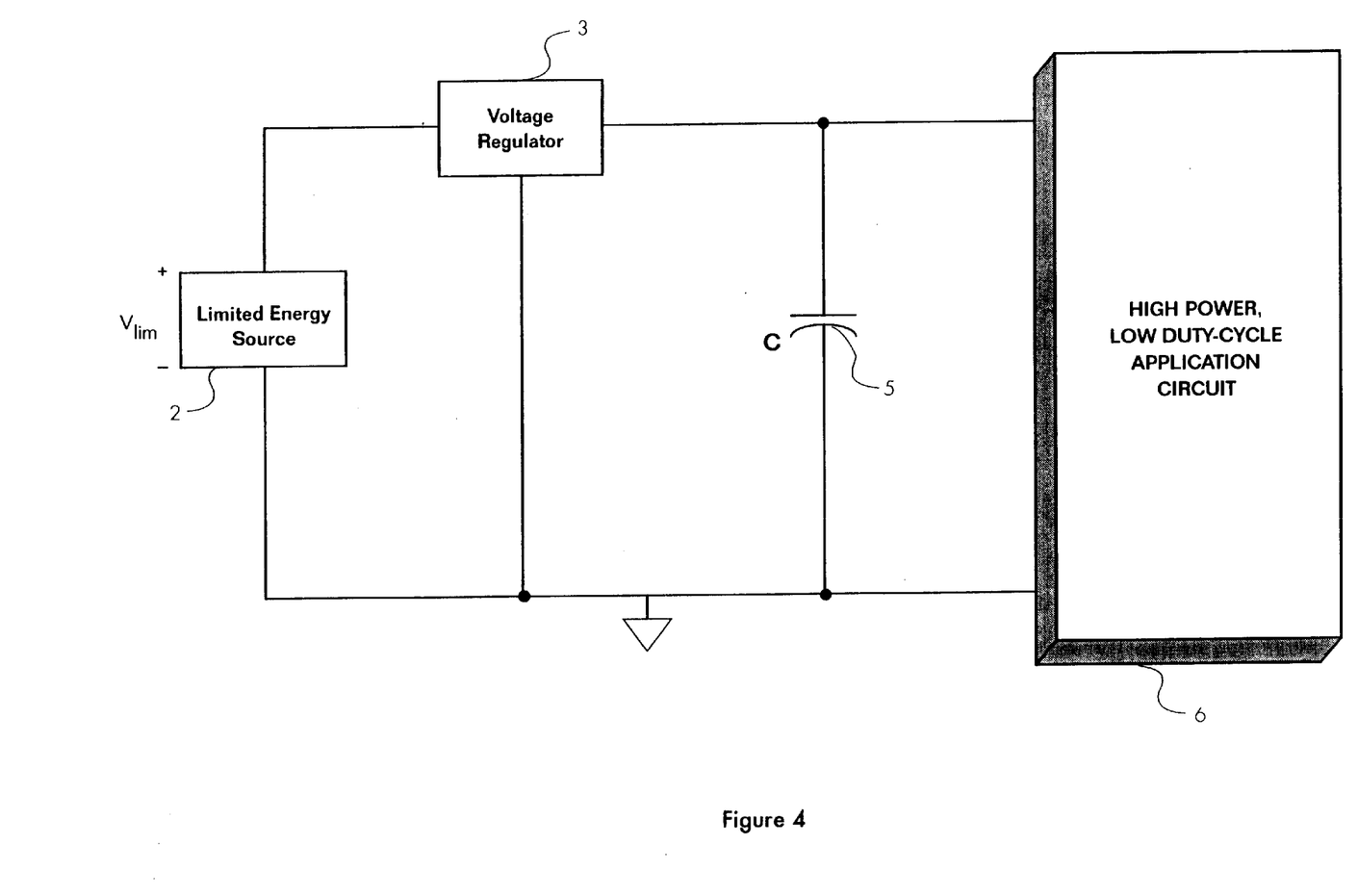
FIG. 4 is a simplified electrical schematic diagram of the preferred embodiment of the present invention.

FIG. 4 depicts the preferred embodiment of the present invention, which incorporates voltage regulator 3 connected between "limited energy" source 2 and high performance capacitive device 5. Voltage regulator 3 insures that capacitive device 5 is always charged to a relatively constant voltage within its working voltage range regardless of the voltage of source 2. Furthermore, this embodiment avoids forcing the RF transmitter power amplifier to operate at the widely varying voltages that could be present at source 2 as it discharges, given the different battery technologies that might be used.

Because of the addition of voltage regulation in FIG. 4, limited energy source 2 may comprise a "voltage-limited" source, i.e., a source capable of supplying only low voltages, particularly, voltages below that required to directly charge the capacitive device in accordance with Equation 1. Source 2 of FIG. 4 may also comprise a "current-limited" source, such as source 4 of FIG. 2. "Voltage-limited" and "current-limited" sources are collectively designated herein as "limited energy sources."

Voltage regulator 3 may be of any construction such as would be known to those of ordinary skill in the art. Such regulators (or converters) would include the following devices: "step-up" regulators (such as a Boost converter); "step-down" regulators (such as a linear regulator or a Buck converter); "step-up/step-down" regulators (such as a Buck/Boost converter, a SEPIC converter, or a Zeta converter); and "inverting" regulators (such as a 'Cuk converter). The type of regulator employed would depend on the voltage characteristics of the circuit. For example, a step-down regulator would be appropriate if the voltage supplied by source 2 remained typically above the working voltage rating of capacitive device 5, as might be the case where source 2 is a "high" voltage source i.e., a source whose voltage is typically higher than the voltage desired for direct input to the power amplifier, such as a high voltage solar cell array or an Ultralife® lithium cell. A step-up regulator would be used where the input voltage is always less than the desired for capacitive device 5. This would include a single alkaline cell (1.5 volts) or a 3.3 volt digital supply.

Step-up/down converters are used where the input voltage may be higher or lower than the desired transmitter input voltage. This would be the case when the system is designed to operate from widely varying sources of supply. For example, a system designed to accept a 9-volt IEC-6LR61 package could encounter initial input voltages as high as 12 volts from a brand new Ultralife® cell, or as low as 5.4 volts from an almost dead Ni—Cd or alkaline cell. Thus, if the target transmitter input voltage were 6.8 volts, it would be useful to use a step-up/step-down converter.

Figure 5:
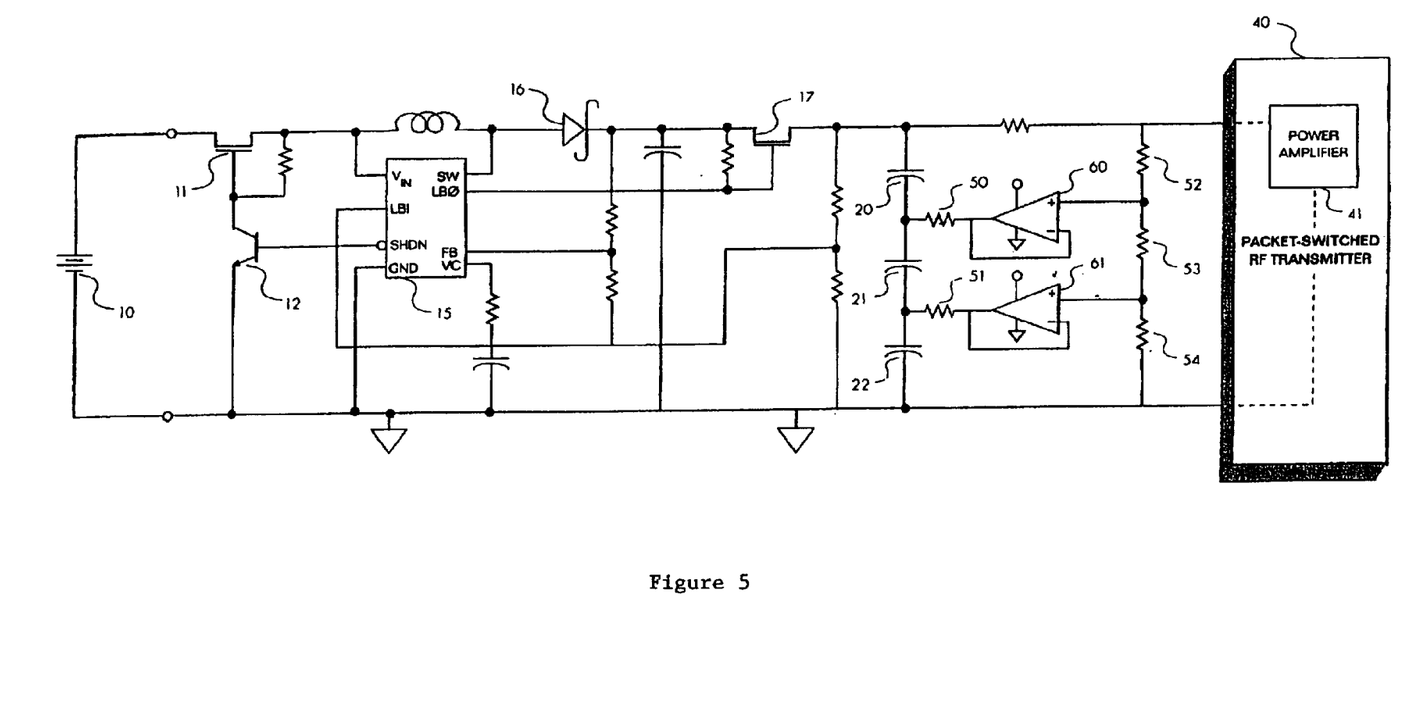
FIG. 5 is a more detailed electrical schematic diagram of the preferred embodiment of the present invention.

FIG. 5 depicts a more detailed implementation of the preferred embodiment. It incorporates a step-up/step-down voltage regulation scheme, allowing the system to accept both low voltage and high voltage initial inputs. In FIG. 5, battery 10 is the limited energy source analogous to element 2 of FIG. 4. The combination of transistors 11 and 12 provide reverse battery protection in the event that the user improperly inserts the battery into the unit. Battery 10 may be either a single cell or a multi-cell stack, including AA cells, AAA cells, a 9-volt alkaline cell stack, Ni—Cd cells, lithium cells, carbon-based cells, or any other battery technology. Alternatively, battery 10 may be removed from the system and replaced by the input power connection of a host computer auxiliary device part (such as a PCMCIA slot), a solar cell array, or a single solar cell.

For the embodiment of FIG. 5, voltage regulation is preferably provided by the combination of an LT1307 step-up switching regulator 15 (from Linear Technology Corp. of Milpitas, Calif.), Schottky diode 16, and a linear regulator made up of a comparator circuit (built into the LT1307) and FET 17. These elements form a step-up/step-down converter which implements voltage regulator 3 of FIG. 4. In this configuration, if the voltage of battery 10 is between 5 volts and 6.8 volts, such as in the case of a discharged Ni—Cd cell stack, switching regulator 15 boosts it to approximately 6.8 volts. If the input from battery 10 is from 6.8 to 12.5 volts, such as with a fresh Ni—Cd or lithium cell, the linear regulator component provides over-voltage protection, holding the output level at approximately 6.8 volts. The "step-down" component of the regulator could be implemented using a SEPIC or a ZETA converter instead of the linear regulator of this embodiment. In FIG. 5, the output of the voltage regulation circuit formed by elements 15, 16, and 17 is connected directly to the super-capacitor network formed by super-capacitors 20, 21, and 22. The working voltage rating of one of these super-capacitors is only about 2.3 to 2.4 volts; but, connected in series, these super-capacitors are driven to produce a substantially constant voltage having a value within the range of approximately 6.7 volts to approximately 7.0 volts when the super-capacitors are fully charged. During the transmit/quiescent cycle, the voltage across the super-capacitors eventually drops to the minimum operating voltage of circuit 40, which could be approximately 5 volts, approximately 3.5 volts, etc., depending on the operating characteristics of transmitter power amplifier 41. In the exemplary embodiment, the power supply system would accept an initial input voltage from source 10 of 5 to 12 volts and nevertheless produce an voltage output which remains within the range of 6.8 volts to 5 volts. The components of RF application circuit 40, therefore, need only accommodate input voltages within this voltage range.

While series connection of super-capacitors 20, 21, and 22 overcomes the general working voltage limitation, leakage current and component variations between the capacitors can lead to a voltage imbalance across the individual capacitors. Such a voltage imbalance can result in one or more of the capacitors in the stack operating at a voltage that exceeds the working voltage of that capacitor. Placing resistors in parallel with the super-capacitors would avoid this problem; however, if resistors alone were used, the circuit would have a high standby current which would ultimately decrease the life of battery 10.

Another aspect of the present invention involves balancing the voltages across individual super-capacitors when multiple super-capacitors connected in series are used as the capacitive device. Such balancing prevents an individual super-capacitor in the series from being driven to a voltage higher than its operational rating as a result of variations in leakage current between the capacitors.

In FIG. 5, a technique known as "active cell balancing" is employed, allowing the circuit to operate with nearly zero standby current. The active cell balancing circuit consists of resistors 52 through 54, which form a resistor divider circuit, low power operational amplifiers 60 and 61, which are configured as voltage followers, and resistors 50 and 51, which limit current flow from the operational amplifiers to the minimum values required to maintain voltage balance among the cells. In FIG. 5, the resistor divider determines the required cell voltages, and the voltage followers force the capacitors to track the resistor voltages regardless of the leakage current. This circuitry ensures that each capacitor takes an equal voltage share. Use of the voltage followers allows resistors 52 to 54 to be three orders of magnitude greater in resistance than they would be in an all resistive cell balancing scheme without operational amplifiers 60 and 61. Thus, this configuration would reduce the leakage current by three orders of magnitude over resistor-only cell balancing. The combination of super-capacitors 20, 21 and 22, resistors 50, 51, 52, 53 and 54, and operational amplifiers 60 and 61 comprise a network which corresponds to high performance capacitive device 5 of FIG. 4.

In FIG. 5, power amplifier 41 for RF transmitter 40 is a very high-current load, drawing approximately 1000 mA or more during transmissions. It is connected directly to the super-capacitor network. In this embodiment, power amplifier 41 should be selected to operate over the 6.8 to 5 volt voltage range previously mentioned, since at the beginning of a long transmission the voltage supplied to it by the super-capacitor network will be about 6.8 volts, but will gradually decrease as the super-capacitors discharge.

Figure 6:
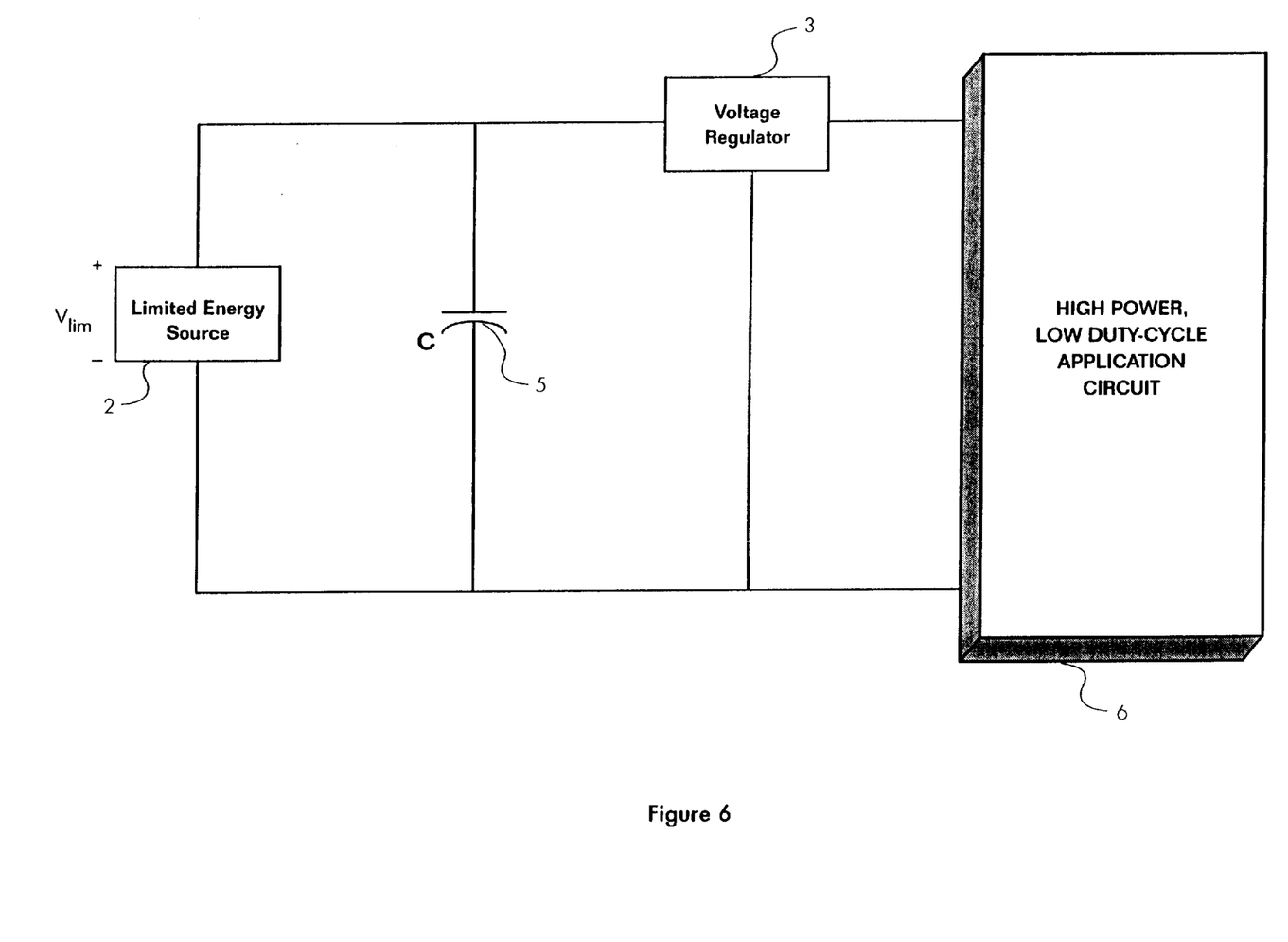
FIG. 6 is a simplified electrical schematic diagram of a first alternative embodiment of the present invention.

An alternative embodiment of the circuit of FIG. 4 is depicted in FIG. 6. The difference between these embodiments is that in FIG. 6, the voltage regulator 3 is connected between capacitive device 5 and application circuit 6. In this circuit, source 2 would typically be a voltage-limited (or low voltage) source. This allows a single super-capacitor having a very high capacitance rating to be used as device 5 instead of several super-capacitors in series connection. In this embodiment, load-leveling is achieved by storing the same amount of energy as in the other embodiments disclosed, but the storage is done at a lower voltage. Load application circuit 6 (e.g. an RF transmitter) is then run directly from regulator 3, which in this case would be a step-up switching regulator operating from the output of the super-capacitors. With this embodiment, however, switching regulator 3 is required to handle very high currents, and consequently its components will be quite large physically. For example, it would be expected that a 1.2 volt source such as a Ni—Cd AA battery powering a 1000 mA, 6.8 volt load would require the voltage regulator to operate at over 7 amps on its input. While such an embodiment would function, it would not be optimal for applications in which component miniaturization and reduced power dissipation concerns are paramount.

Figure 7:
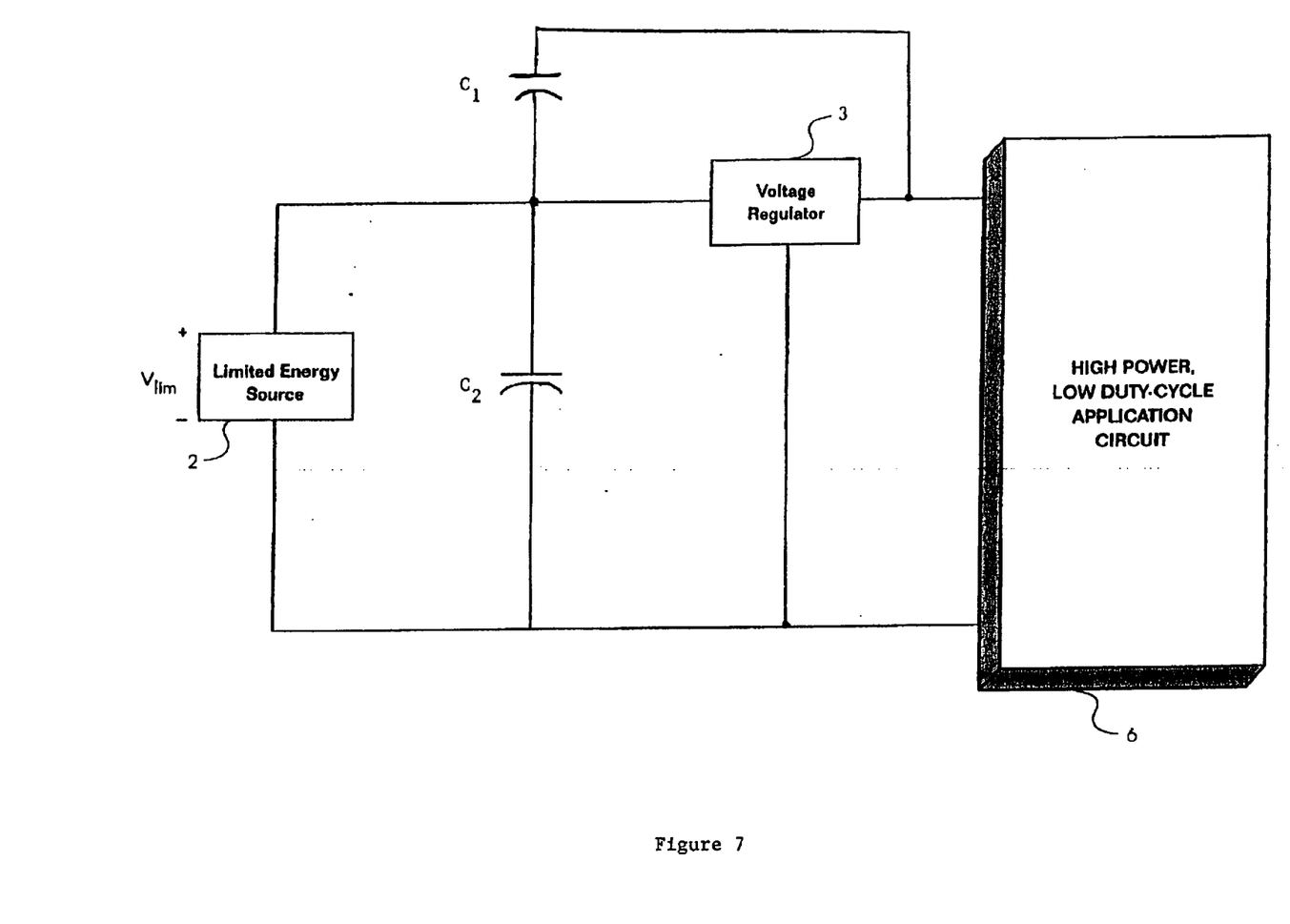
FIG. 7 is a simplified electrical schematic diagram of a second alternative embodiment of the present invention.

Another embodiment of the present invention is shown in FIG. 7. In this circuit, two super-capacitors C1 and C2 are used to supply energy to the load application circuit 6 (e.g. an RF transmitter). Source 2, which is typically a voltage-limited (or low voltage) source such as an AA battery, is used to charge capacitor C2. Regulator 3, which in this case would be a boost switching regulator operating from the output of capacitor C2, charges capacitor C1. In this embodiment capacitor C2 is smaller than capacitor C1 to allow it to be rapidly charged form the source 2. When delivering power to the load 6, regulator 3 is normally shut off to reduce noise. An advantage of this circuit is that only one large capacitor C1 and one small capacitor C2 is utilized in comparison to the circuit of FIG. 5. In addition no cell balancing is required.

Having described in detail the preferred and alternate embodiments of the present invention, including preferred modes of operation, it is to be understood that the present invention could be carried out with different elements and steps. The preferred and alternate embodiments are presented only by way of example and are not meant to limit the scope of the present invention which is defined by the following claims.

What is claimed is:

1. A method for extending the operational life of a battery device used to provide power to a low-duty cycle load circuit in a portable electronic device comprising the steps of:
   providing a capacitance network in the device;
   charging the capacitance network with the battery device; and
   providing energy to the load circuit, via the capacitance network, during the active portion of the duty cycle of the load.

2. The method according to claim 1 wherein the charging step comprises the steps of:
   powering a voltage regulator by the battery device; and
   charging the capacitance network with the voltage regulator.

3. The method according to claim 2 wherein the voltage regulator is a switching power converter.

4. The method according to claim 3 wherein the switching power converter is a boost converter.

5. The method of claim 1 wherein the providing energy to the load circuit step comprises the steps of:
   powering a voltage regulator by the capacitance network; and
   powering the load circuit with said voltage regulator.

6. The method according to claim 5 wherein the voltage regulator is a switching power converter.

7. The method according to claim 6 wherein the switching power converter is a boost converter.

8. The method of claim 1 wherein the capacitance network has sufficient energy storage capacity to power the load circuit during the active portion of the load circuit's duty cycle.

9. The method of claim 1 wherein the capacitance network comprises a single super-capacitor.

10. The method of claim 1 wherein the capacitance network comprises a plurality of super-capacitors in series.

11. The method of claim 10 wherein the capacitance network further comprises a voltage balancing circuit coupled to said plurality of super-capacitors wherein the voltage balancing circuit is operable to cause said plurality of super-capacitors to reach an approximately equalized voltage state.

12. The method of claim 11 wherein voltage balancing circuit comprises a voltage divider network and an op-amp network having an op-amp configured as a voltage follower.

13. The method of claim 1 wherein the capacitance network has an ESR that is less than the ESR of the battery device.

14. The method of claim 1 wherein the load circuit a transmitter circuit.

15. The method of claim 14 wherein the transmitter circuit is an rf transmitter circuit.

16. The method of claim 15 wherein the rf transmitter circuit is a packet-switched transmitter circuit.

17. The method of claim 1 wherein the battery device is an alkaline battery.

18. The method of claim 1 wherein the portable electronic device is a wireless communication device.

19. The method of claim 1 wherein the portable electronic device is a two-way pager.

20. The method of claim 1 wherein the portable electronic device is a cellular phone.

21. A method for extending the operational life of a battery device used to provide power to a low-duty cycle load circuit in a portable electronic device comprising the steps of:
   providing a capacitance network and a voltage regulator wherein the capacitance network comprises a first capacitance component and a second capacitance component;
   charging said second capacitive component with the battery device;
   powering said voltage regulator with said second capacitance component;
   charging said first capacitance component with said voltage regulator; and
   providing energy to the load circuit, via the capacitance network, during the active portion of the duty cycle.

22. The method of claim 21 wherein said voltage regulator is inactive during the active portion of the duty cycle.

23. The method of claim 21 wherein the first capacitance component has a higher capacitance than the second capacitance component.

24. The method of claim 21 wherein the portable electronic device is a wireless communication device.

25. The method of claim 21 wherein the portable electronic device is a two-way pager.

26. The method of claim 21 wherein the portable electronic device is a cellular phone.

27. A power management system for a portable electronic device having a low duty cycle transmitter comprising:
   a limited energy source;
   a capacitive network coupled to said limited energy source and to the transmitter, said capacitance network comprising a first capacitance component and a second capacitance component; and
   a voltage regulator coupled to the capacitive network; and
   wherein said limited energy source charges the second capacitive component, said second capacitive component provides energy to said voltage regulator, said voltage regulator charges said first capacitance component, and said capacitive network provides sufficient energy to power the transmitter when the transmitter is actively transmitting.

28. The power management system of claim 27 wherein the limited energy source is an alkaline battery.

29. The power management system of claim 27 wherein the limited energy source is a host computer auxiliary device port.

30. The power management system of claim 27 wherein the limited energy source is a photovoltaic device.

31. The power management system of claim 27 wherein the limited energy source is a solar cell array comprising at least one solar cell.

32. The power management system of claim 27 wherein said first capacitance component and said second capacitance component each comprise at least one super-capacitor.

33. The power management system of claim 27 wherein the voltage regulator is a switching power converter.

34. The power management system of claim 33 wherein the switching power converter is a boost converter.

35. The power management system of claim 33 wherein the switching power converter is a step up/step down converter.

36. The power management system of claim 33 wherein the switching power converter is a step-down converter.

37. The power management system of claim 27 wherein the first capacitance component has a higher capacitance than the second capacitance component.

38. The power management system of claim 27 wherein said voltage regulator is inactive when the transmitter transmits.

39. The power management system of claim 27 wherein the capacitance network has an ESR that is less than the ESR of the limited energy source.

40. The power management system of claim 27 wherein the portable electronic device is a wireless communication device.

41. The power management system of claim 27 wherein the portable electronic device is a two-way pager.

42. The power management system of claim 27 wherein the portable electronic device is a cellular phone.

43. A power management system for a portable electronic device having a low duty cycle transmitter comprising:
   a limited energy source;
   a capacitive network coupled to said limited energy source; and
   a voltage regulator coupled to said capacitive network and to the transmitter; and
   wherein said limited energy source charges the capacitive network, said capacitive network provides energy to said voltage regulator, and said voltage regulator provides sufficient energy to power the transmitter when the transmitter is actively transmitting.

44. The power management system of claim 43 wherein said capacitance network comprises a first capacitance component and a second capacitance component.

45. The power management system of claim 44 wherein said capacitance network further comprises a voltage balancing network coupled to said first capacitance component and said second capacitance component wherein the voltage balancing circuit is operable to cause said first capacitance component and said second capacitance component to reach an approximately equalized voltage state.

46. The power management system of claim 45 wherein the voltage balancing circuit comprises a voltage divider network and an op-amp network having an op-amp configured as a voltage follower.

47. The power management system of claim 43 wherein the limited energy source is an alkaline battery.

48. The power management system of claim 43 wherein said capacitance network comprises at least one supercapacitor.

49. The power management system of claim 43 wherein the voltage regulator is a switching power converter.

50. The power management system of claim 49 wherein the switching power converter is a boost converter.

51. The power management system of claim 43 wherein the capacitance network has an ESR that is less than the ESR of the limited energy source.

52. The power management system of claim 43 wherein the portable electronic device is a wireless communication device.

53. The power management system of claim 43 wherein the portable electronic device is a two-way pager.

54. The power management system of claim 43 wherein the portable electronic device is a cellular phone.

55. A power management system for a portable device having a low duty cycle transmitter comprising:
   a limited energy source;
   a capacitive network coupled to said limited energy source; and
   a voltage regulator coupled to said capacitive network and to the transmitter; and
   wherein said limited energy source provides energy to said voltage regulator, said voltage regulator charges the capacitive network, and said capacitive network provides sufficient energy to power the transmitter when the transmitter is actively transmitting.

56. The power management system of claim 55 wherein said capacitance network comprises a first capacitance component and a second capacitance component.

57. The power management system of claim 56 wherein said capacitance network further comprises a voltage balancing network coupled to said first capacitance component and said second capacitance component wherein the voltage balancing circuit is operable to cause said first capacitance component and said second capacitance component to reach an approximately equalized voltage state.

58. The power management system of claim 55 wherein the voltage balancing circuit comprises a voltage divider network and an op-amp network having an op-amp configured as a voltage follower.

59. The power management system of claim 55 wherein the limited energy source is an alkaline battery.

60. The power management system of claim 55 wherein said capacitance network comprises at least one supercapacitor.

61. The power management system of claim 55 wherein the voltage regulator is a switching power converter.

62. The power management system of claim 61 wherein the switching power converter is a boost converter.

63. The power management system of claim 55 wherein the capacitance network has an ESR that is less than the ESR of the limited energy source.

64. The power management system of claim 55 wherein the portable electronic device is a wireless communication device.

65. The power management system of claim 55 wherein the portable electronic device is a two-way pager.

66. The power management system of claim 55 wherein the portable electronic device is a cellular phone.

* * * * *